United States Patent [19]

McClendon

[11] 4,257,217

[45] Mar. 24, 1981

[54] APPARATUS AND PROCESS FOR FIELD HARVESTING OF PEPPERS

[76] Inventor: Jimmy R. McClendon, P.O. Box 345, Tulia, Tex. 79088

[21] Appl. No.: 81,268

[22] Filed: Oct. 2, 1979

[51] Int. Cl.³ .............................................. A01D 46/00
[52] U.S. Cl. ................................ 56/327 R; 56/328 R
[58] Field of Search ................ 56/327 R, 330, 121.42, 56/328 R, 27.5

[56] References Cited

U.S. PATENT DOCUMENTS

| | | | |
|---|---|---|---|
| 3,475,888 | 11/1969 | Staats, Jr. et al. | 56/328 R |
| 3,527,039 | 9/1970 | Recker | 56/328 R |
| 3,581,484 | 6/1971 | Gilbert | 56/322 R |
| 3,601,959 | 8/1971 | Pinkham | 56/27.5 |
| 3,830,048 | 8/1974 | Erwin | 56/330 |
| 3,838,559 | 10/1974 | Stang et al. | 56/322 R |

*Primary Examiner*—Paul J. Hirsch

*Attorney, Agent, or Firm*—Ely Silverman

[57] ABSTRACT

A traveling field harvester for pepper plants comprises a pair of generally mirror image tapered helical rod assemblies located on each side of a longitudinally extending slot in which plants to be treated by the harvester are located. The rods are rotated in timed and phased relationship about horizontally spaced apart axes of frustoconical surfaces with axes closer together at their rear than at their front and both located in a forwardly and downwardly inclined horizontally extending flat plane. The phasing and timing of the moving rods controllably and evenly contacts and shakes and kneads the pepper plants standing in the field to selectively remove mature peppers from those pepper plants in an automatic smooth harvesting action that does no harm to the plants and allows a subsequent similar treatment of the plants for later selective harvesting of later maturing peppers.

12 Claims, 24 Drawing Figures

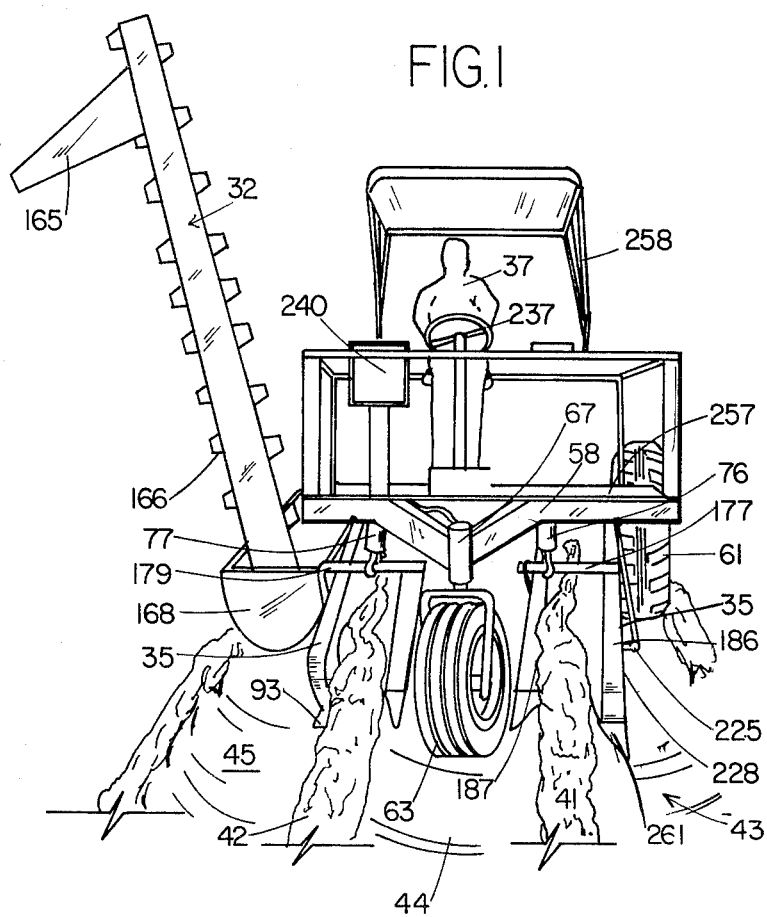
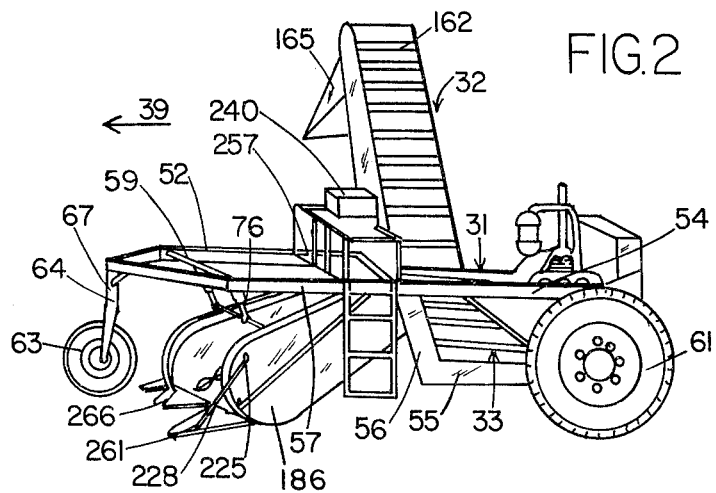

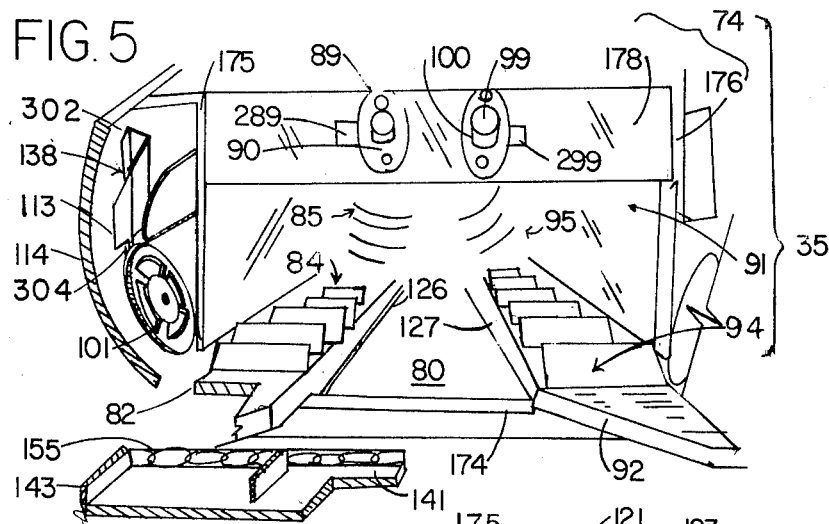
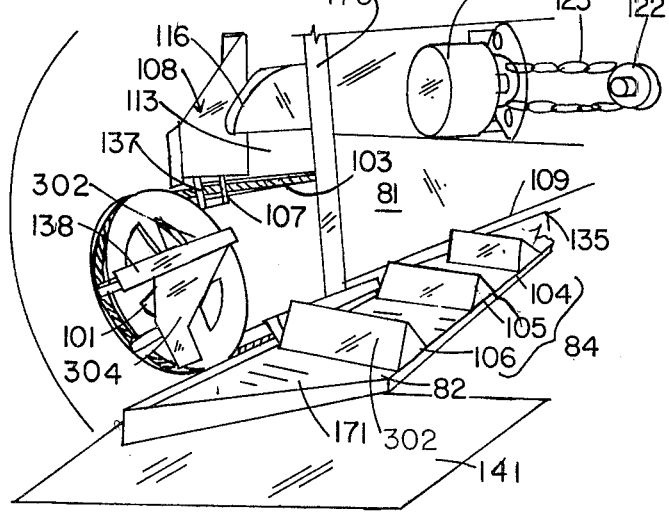
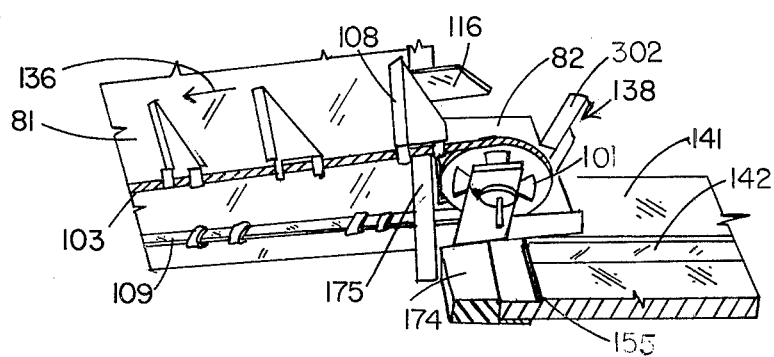

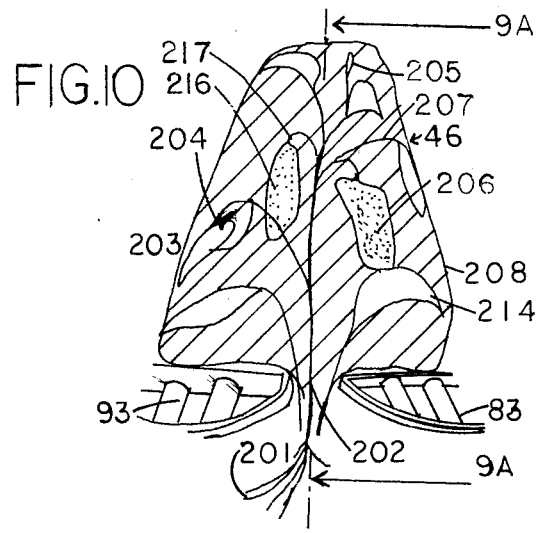
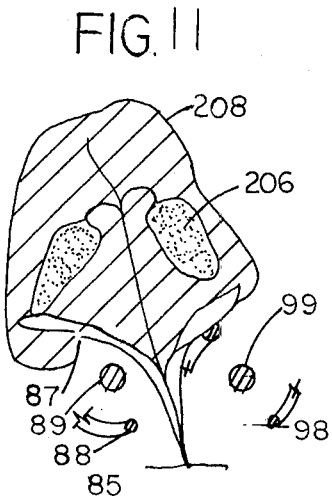
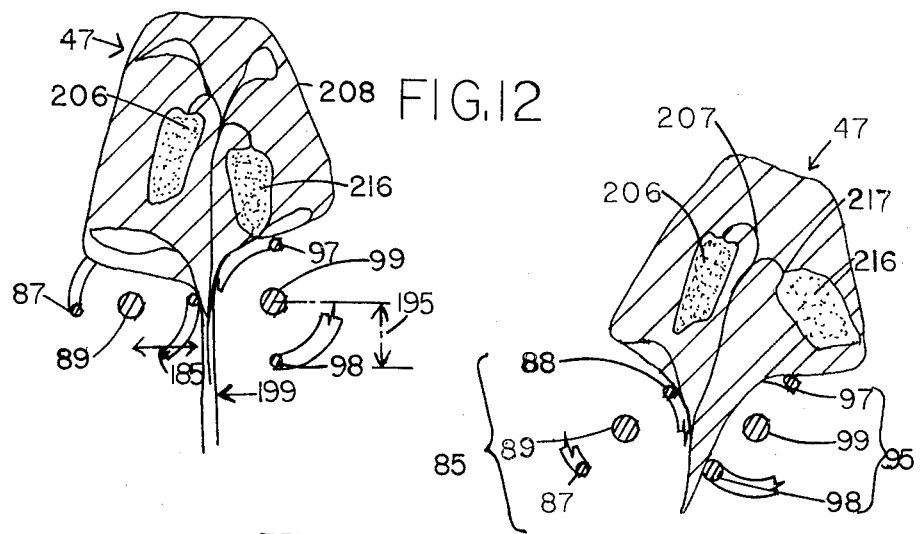
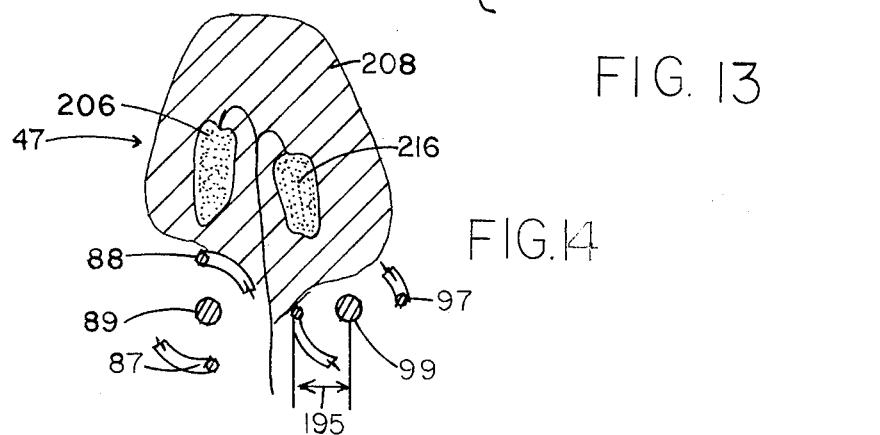
FIG.10 FIG.11 FIG.12 FIG.13 FIG.14

APPARATUS AND PROCESS FOR FIELD HARVESTING OF PEPPERS

BACKGROUND OF THE INVENTION

1. Field of the Invention

The field of art to which this invention pertains are machines for harvesting crops.

2. Description of the Prior Art

Representative pertinent prior U.S. Pat. Nos. known are: 3,830,048; 3,705,482; 3,587,216; 3,581,484; 3,301,331; 3,286,774; 2,903,839.

While the prior art has provided harvesting apparatuses it has not provided apparatuses that provide a discriminating action between the fruit and non-mature fruit but rather has provided principally apparatuses and processes for harvesting substantially all of the separable fruit on a vine or plant or have severed the fruit in such a manner as to not permit further growth of the fruit which at the time of harvesting is not yet mature. Such apparatus have not provided for a discriminating action between those fruits of a plant which are adequately mature to be properly picked and those fruit which are not in a sufficiently mature state to justify removal and, additionally, to provide for subsequent action on the same plant while growing in the field so that the fruit which were initially insufficiently mature for proper picking could be subsequently harvested following a growth which was not interfered with by the initial harvesting action.

SUMMARY OF THE INVENTION

A traveling field harvestor (30) for pepper plants (as 46 and 47) comprises an apparatus with a plurality of assemblies (34 and 35) each comprising a pair of generally mirror-image rigid helical rod assemblies (as 85 and 95) each such helical assembly (as 85 and 95) located on opposite sides of longitudinally extending slot (as 80) in which plants to be treated (as 46 and 47) by the harvester are located. The helical assemblies (as 85 and 95) are concurrently rotated in opposite directions (as 118 and 119) between a pair of mirror image like cooperating upwardly and rearwardly inclined drag plate assemblies (as 84 for helical assembly 85 and as 94 for helical assembly 95) that adjustably contact the ground at their front ends in order to effectively meet and engage the bottom portion of the plants to be harvested (as shown in FIG. 9). The inner and outer floor plate assemblies (as 82 and 92) and the inner and outer right drag plate assemblies (84 and 94) are located on opposite sides of the longitudinally extending slot (80). The drag plate assemblies are located above the floor plate assemblies and the helical assemblies (as 85 and 95) are located above the slot (80) and above the upwardly moving portions (135) of the drag plate assemblies (84 and 94).

Each of the helical assemblies (85 and 95) comprises a set of like generally helical rods, (as 87 and 88 for assembly 85) located 180 degrees apart from each other on the same shaft and the segments of each of such helical rods are located in the same surface of a frustrum of a cone. The different helical assemblies (85 and 95) are rotated in fixed time and phase cooperating relationship about the horizontally spaced apart support shafts, (as 89 and 99) therefor; those support shafts extend along the axes of the frustoconical surfaces and those axes are closer together at their rear ends than at their front ends and are both located in a forwardly and downwardly inclined horizontally extending flat plane. The phasing and timing of the moving rods controllably and evenly contacts and shakes and kneads the pepper plants located in the slot (80) while those plants are standing in the field to selectively remove mature peppers from those pepper plants in an automatic smooth harvesting action that does no harm to the plants and allows a subsequent similar treatment of the same plants in the field for later selective harvesting in the field of later maturing peppers.

The gathered peppers are deposited on a plate and conveyor assembly that allows for continual inspection of such harvested peppers by an operator of apparatus 30 during field operation of the harvester and for control by that operator of the operations of the helical rods in the selective mature pepper removing action as well as transfer of the gathered peppers to a collection vehicle (as 170) traveling over a field (40) together with the traveling field harvester (30).

BRIEF DESCRIPTION OF THE DRAWINGS

FIG. 1 is an overall front view of the apparatus 30 while traveling along a group of rows of a pepper plant crop.

FIG. 2 is a side view of the apparatus 30 shown in FIG. 1 as seen along direction of arrow 2A of FIG. 1.

FIG. 5 is a view along the rear end of the right separator and conveyor assembly 35 looking along the length of that assembly from rear to front of its slot 80.

FIG. 6 is a view of the inner wall 81 drag plate assembly 84 and floor plate 82 of the right separator and conveyor assembly 35 at zone 6A of FIG. 5, enlarged.

FIG. 7 is a top oblique view at the rear end of central surface of the inner plate 81, and nearby portions of the drag plate assembly 84 (with the cover 114 removed).

FIG. 10 is a transverse vertical section taken along the plane 10A—10A of FIG. 9 diagrammatically showing a plant 46 in a row as 42 treated by the apparatus 30 when the plant is in initial engagement with the guide plates as 83 and 93 of the right separator and conveyor assembly 35.

FIG. 11A is a diagrammatic view taken along the plane 11A—11A of FIG. 8, which plane is also diagrammatically shown in FIG. 9, perpendicular to the axes of shafts 89 and 99, during a stage in operation of the helical assemblies 85 and 95 on the lower portion of plant as 46. In FIGS. 11-18 the sections are taken looking in a forward direction, i.e. FIGS. 11-14 are taken along the plane 11A—11A of FIGS. 8 and 10 looking forward with the outer right helical assembly 95 shown on the right hand side of FIGS. 11-18 and the right inner helical assembly 85 shown on the left hand side of FIGS. 11-18.

FIG. 12 is a view taken as in FIG. 11 wherein each of the helical assemblies 85 and 95 have rotated 45° from the position shown in FIG. 11.

FIG. 13 shows the relation of the helical assemblies and the plant at a position wherein the assemblies 85 and 95 have rotated 45° past their position shown in FIG. 12.

FIG. 14 shows the relations of the portions of the helical assemblies 85 and 95 as shown in FIGS. 11-13 when the segments 85 and 95 of separator and conveyor assembly have advanced 45° from the position thereof shown in FIG. 13.

FIGS. 15-18 show the operation of the helical assemblies 85 and 95 on a plant as 46 as when the apparatus 30 has advanced relative to the plant 46 so that higher portions of the plant 46 are acted upon by the assemblies 85 and 95; this series of diagrammatic presentations illustrate the relations of segments of the helical assemblies 85 and 95 and the upper portions of the plant as 46 at successive movement of 45 degrees. The sectional views of FIGS. 15-18 are taken along a plane near to the middle of the separator and conveyor assembly 35, as section 15A—15A of FIG. 8, whereat the radius 185 and 195 of the assemblies 85 and 95 is less than in FIGS. 11-14.

DESCRIPTION OF THE PREFERRED EMBODIMENT

Figure 3:
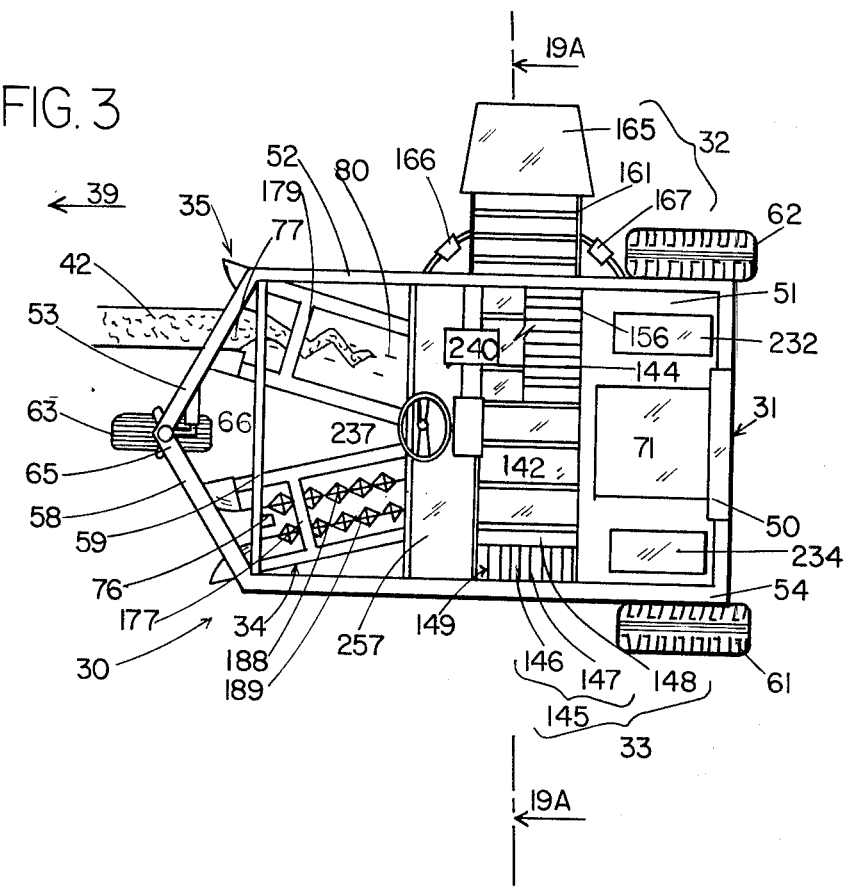
FIG. 3 is a top or plan view of the apparatus 30 showing the location of treated plants in the right hand separator and conveyor assembly 35 while apparatus 30 moves through a field with standing rows of such crops. The left hand separator and conveyor assembly 34 is shown empty of crops treated thereby to better illustrate the relations of the parts of the apparatus. This figure is also broken away in zone 3A to illustrate portions of the cleaner conveyor and screen assembly 33.
Figure 4:
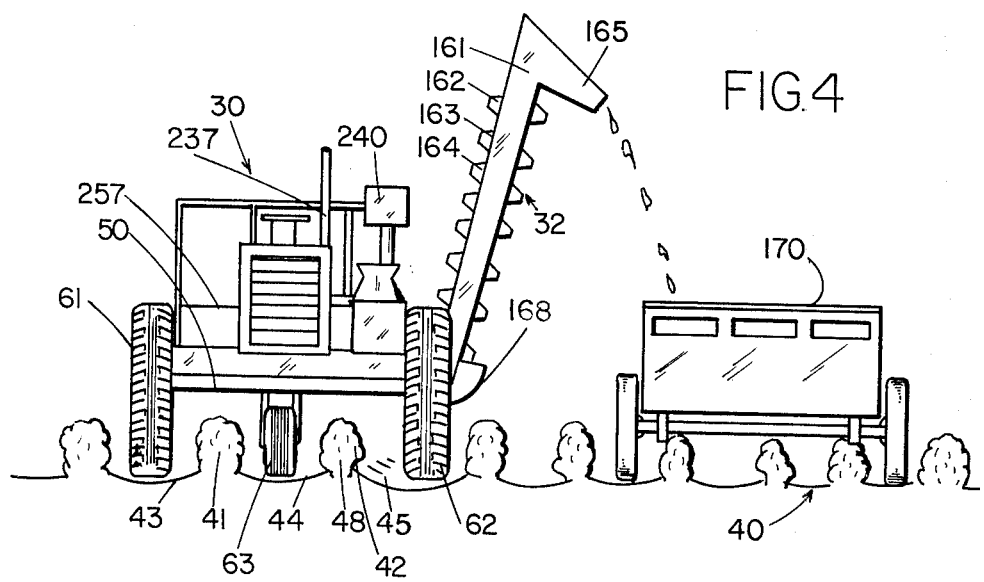
FIG. 4 is a rear view of the apparatus 30 passing through a field 40 and while stripping the peppers from the plant as in rows 41 and 42 and depositing them into a carrier trailer 170.

The pepper picker and harvester apparatus 30 comprises a wheeled support frame assembly, 31, a discharge conveyor and frame assembly, 32, a cleaner conveyor and screen assembly, 33, a left separator and conveyor assembly, 34, a right hand separator and conveyor assembly, 35, and a power and control assembly 36.

The terms "left" and "right" as used herein refer to the left and right, respectively, as seen by an operator, as 37, seated in the operator's seat 38 and facing in the forward direction, 39.

The apparatus 30 operates in a field as 40 and treats a crop thereon composed of a plurality of rows of pepper plants as left hand plant row 41 and a right hand plant row 42. The rows 41 and 42 are separated by a central field furrow as 44 and other field furrows as 43 are located on the left hand side of row 41 and furrow 45 on the right hand side of row 42 are provided in the field. The wheels, 61, 62, and 63 of the apparatus 30 travel in those furrows, the left back drive wheel 61 being located in the left furrow 43, the right back drive wheel 62 being located in the right hand furrow 45 and the center front steering wheel 63 being located in the center furrow 44. The pepper plants as 46 and 47 in the row 42 are located on a raised hillock as 48 between the furrows 43 and 44. Wheel 63 is rotatably supported in a fork 64.

The wheel support frame assembly 31 comprises a back end horizontal member 50, a right side rear horizontal member 51, a right side front horizontal member 52, a right side front diagonal horizontal member 53, a left rear upper horizontal member 54, left lower rear horizontal member 55, a left side middle vertical member 56, a left side front horizontal member 57, and a left front end horizontal diagonal member 58. A front transverse member 59 is firmly joined to the front horizontal members 52 and 58. The members 50-59 are all rigid steel box beams and firmly joined to form a rigid frame as shown in FIGS. 1-4. The drive wheels 61 and 62 are rotatably supported on the frame in journals therefor and also rotatably support the rear end of the frame. A front wheel fork 64 is rotatably connected to the frame at a fork journal 67. A fork wheel control arm 65 is fixedly connected to the top of the fork 64 and an expansible steering control hydraulic piston assembly 66 is operatively connected between the arm 65 and the right front end horizontal beam 53. The control piston 66 is operatively connected to the power and control assembly 36 for controlling movement of the front wheel 63. A diesel or gasoline motor 71 of the power and control assembly 36 is operatively connected to the wheels 61 and 62 through the power and control assembly 36, as in FIG. 19.

The left separator and conveyor assembly 34 and the right separator and conveyor assembly 35 are each separately pivotally supported on frame 31 near the rear ends of such separator and conveyor assemblies. A left expensible control piston assembly 76 is movably connected between the front transverse frame member 59 and a top support beam 177 for the left separator and conveyor assembly while a like right hydraulic expansible control piston assembly 77 is pivotally connected at its top to the front transverse beam member 59 and at its bottom to the right support beam 179 for the right separator and conveyor assembly 35.

Each of the separator and conveyor assemblies 34 and 35 is a mirror image of the other so the below description of the right separator and conveyor assembly 35 applies also to the left separator and conveyor assembly 34.

The right separator and conveyor assembly 35 comprises a frame, 74, a right inner rigid vertical inner wall, 81, a right inner floor members 82, a right front inner guide 83, a right inner drag plate assembly 84, an inner right helix assembly 85, a right hand separator and conveyor assembly vertical outer wall 91, a right side outer floor 92, a front right outer guide 93, a right side outer drag plate assembly 94, and a right side outer helix assembly 95 and a right separator assembly slot 80.

Frame 74 comprises rear bottom beam 174 with pivotal attachment to the frame 31, a rigid inner side frame member 175, an outer side frame member 176, a rigid front top support member 177, and a rigid rear axle journal support plate 178 all firmly joined together. The inner and outer side members are rigid vertically extending frames and spaced apart and parallel: members 174 177 and 178 are horizonally extending rigid beams that firmly attached to frames 175 and 176 as shown in FIGS. 5 and 1 and hold them in position.

The inner and outer walls 81 and 91, the inner and outer floor member 82 and 92, the inner and outer guides 83 and 93 and the inner and outer drag plate assemblies 84 and 94 are, respectively, mirror images of each other, so the description of the inner structures 81, 82, 83 and 84 applies to corresponding outer structures 91, 92, 93 and 94 respectively for the right separator and conveyor assembly 35, and for the structures similar to 81–84 and 91–94 in left hand assembly 34.

The right separator and conveyor assembly inner rigid wall 81 is attached to the inner frame member 175 and extends longitudinally forward and downward from behind the point of pivotal attachment of frame 74 to the frame 31 to near to the ground over which the apparatus 30 operates. The inner wall 81 is centrally located closer to the center line of the apparatus 30 than is the like outer right separator and conveyor assembly wall 91.

Walls 81 and 91 are generally parallel to each other, smooth, imperforated and vertical, and supported on frame 74.

The slotted rigid inner floor plate 82 is a rigid flat steel plate elongated from front to rear with straight side edges and many uniformly spaced transverse slots as 171, 172, 173. Its right edge has an upwardly extending lip near to but spaced from end parallel to the bottom edge of the inner wall 81. The plate 82 extends forwardly and downwardly: its left edge is adjacent the slot 80. Horizontally extending rigid frame members of frame 74 hold the plate 82 in fixed position relative to the inner wall 81. The floor plate 82 and the inner wall 81 are separated by a thin right inner drag unit plate slot 109 between the bottom of plate 81 and the top of the right edge of inner plate 82.

The slotted rigid outer floor plate 92 is a mirror image of the inner floor plate 82. Its left edge bounds the slot 80 and its right edge is separated from the vertical outer wall 91 by a right outer drag unit plate slot 120 corresponding in size and shape and function to slot 109.

The right inner helix assembly 85 of the right hand separator and conveyor assembly 35 comprises a right inner front helix journal 86, an advanced helix 87, a retarded helix 88, and a right inner helix unit shaft 89, and a right inner rear journal 90. The right outer separator and conveyor unit assembly helix assembly 95 comprises a right end outer helix assembly front journal 96, a right hand outer advanced helix 97, a right hand outer retarded helix 88, a right hand outer helix unit shaft 99 and a right hand outer rear shaft journal 100. Helixes 87 and 88 are formed counterclockwise rearwardly. Helixes 97 and 98 are formed clockwise rearwardly.

The shaft 89 is a rigid cylindrical shaft on which are located and supported helix 87 and helix 88. The shaft 89 is rotatably supported in the front helix journal 86 and the rear helix journal 90. Those journals 86 and 90 are firmly attached to the right inner floor member 82 and frame 74. The upper end of the shaft 89 is rotated by a motor 121 which also is attached by a timing and drive chain 123 to a sprocket wheel 122 on the shaft 99 for the right outer helix assembly 95. In operation the right inner helix turns clockwise as seen from the front and shown by arrow 118 in FIG. 8 while the right outer helix turns counter clockwise in the direction 119 as seen from the front.

The right inner floor 82 for the right separator and conveyor assembly 35 extends laterally from the right inner wall 81 to a floor outer edge 26 and the outer floor 92 of the right separator and conveyor assembly extends inward to an inner floor edge 127. The floor edges 126 and 127 are separated from each other by right separator and conveyor assembly central slot 80.

The right inner drag plate assembly 84 of the right separator and conveyor assembly 35 comprises an inner drag plate assembly top wheel 101, a bottom inner drag plate assembly wheel 102, a right inner drag plate cable 103, and a series of like drag plate units as 104, 105, 106, 108, 134 and 138. The inner drag plate assembly top wheel 101 is attached onto the right inner wall at the rear thereof and the bottom inner drag plate assembly wheel 102 is attached at the front end of the right inner wall of the right separator and cleaner conveyor assembly 35. The inner drag plate assembly cable 103—which also may be a chain to maintain the timing relations—is trained or guided over slot in the wheels 101 and 102, which are pulley wheels with peripheral recesses therein for location of such cable or chain. Each drag unit as 104 comprises a rigid drag unit plate as 108 that is firmly attached to two clamps therefor, as 107 and 137, and the clamps are firmly attached onto the chain or cable 103 at equally spaced intervals. Each guide plate moves through a right inner drag unit plate guide slot 110 at the front of wall 81 and along the right inner drag unit guide slot 109 to the rear of the right inner wall of the right separator and conveyor assembly 35. Bottom right inner drag unit slot 110 is located at the bottom of the right inner wall 81 slightly above the top of the right inner floor plate 82. The guide plates as 104 and 105 travel in series in one path, 135, located immediately above the plate 82 and another, higher return path, 136, located within the drag unit plate compartment 113 which is located inwardly or centrally of the inner wall 81. Drag plate compartment 113 is separated from the exterior by a compartment wall 114 which is pivotally attached at its top to the inner wall 81. As shown in FIGS. 6 and 7, inner wall 81 near wheel 101 is provided with a guide plate 116 at the upper end thereof to provide for engaging plates as 104, 105, 106, 108 and guiding them into compartment 113 through which the drag plates travel until the cable passes around bottom pulley wheel 102 and the guide plates encounter guide plate 117, which plate is located on and supported by the wall 81 whereby each drag plate (as 134) is located in position slightly above the inner floor 82 of the right separator and conveyor assembly and then moved upward and rearwardly along the path 135 to the upper drag plate assembly pulley wheel 101: during such movement the drag plates engage the pepper fruits which have been separated from the pepper plates by the helices 87, 88, 97 and 98 of the separator assembly 35 on the right side (and 34 on the left) and move such separated fruits upwards along the plates 82 and 92 to the cleaner plate 141 of the cleaner conveyor and screen assembly 33.

A plurality of longitudinally spaced apart rigid transverse bars, the right hand outer helix transverse bar supports, 191, 192 and 193 are each connected at their inner end to the inner helical shaft as 99 and, at their outer end to helix 97 and helix 98. Similarly on the inner right hand helix assembly 85 a plurality of longitudinally spaced rigid transverse bars 181, 182 and 183 are firmly attached to the inner right hand helical shaft 89. These arms firmly attached and hold and space the helices 87 and 88 to the inner right hand helix shaft 89. The helices 97 and 98 on the outer shaft 99 of the outer helical assembly 95 are the same size but are mirror images of the helices 87 and 88 supported on and attached to the shaft 89 of right inner helical assembly 85.

Helixes 87, 88, 97 and 98 are steel roundsectioned helical rods.

The spacing between the helical assembly components provides for operating on the pepper plants as 46 and 47 treated thereby; each plant is positioned within the slot 80 and between components of the helical assemblies 85 and 95, as shown in FIGS. 9-18. Details of this action are herebelow described.

The transverse members as 181, 182 and 183 attached to inner helical assembly shaft 89 all lie in the same flat plane and the transverse members as 191, 192, 193 attached to outer helical shaft 99 lie in a flat plane; however, the plane in which the transverse members 181, 182, 183 lie is perpendicular to the plane in which the transverse members 191, 192 and 93 lie. The transverse members are all located at the same longitudinal spacing distance from each other on both shafts, 89 and 99, which are straight rigid steel shafts.

Each pepper plant as 46 and 47 is composed of roots 201, main trunk portions 202, lateral branches thereof 203, leaves 204, flowers 205 and fruits 206, the roots being firmly attached to the ground and the roots connected to the plant main trunk portions, the lateral branches attached to the main trunk portion, the leaves and flowers attached to the lateral branches, and the fruits attached by a stem as 207 to the main trunk portions or larger lateral branches. The leaves provide an external outline 208 to the plant which is wider at its bottom than at its top, having a generally frustoconical shape with the lowest leaves resting on the ground and the fruits at varying heights on the main trunk portions within the outline formed by the leaves. Each u-shaped bent stem to which the peppers are attached is, when the fruit is sufficiently mature to be picked, not flexible and is stiff or brittle and is engaged by the helical rods and broken. Initially the peppers as 205 on a given plant as 206 are located close to the main stem and within the outline of the plant formed by its peripheral leaves as in FIGS. 9 and 10. Each of the guides, as 83, comprises (i) a front, smoothly curved rigid edge bar, 221, extending convexly forwardly and away from slot 80, (ii) a rear transverse bar 222 and (iii) longitudinally extending bars as 223 and 224 between bars 221 and 222 and attached thereto. Rear bar 222 is firmly attached to front edge of plate 82.

In operation of the apparatus 30, the guides as 83 and 84 engage and lift the lowest leaves together with the branches.

The straight rigid shafts 89 and 99 are closer together at the rear ends thereof in journals 90 (for shaft 89) and 100 (for 99) than they are at the front ends thereof in journals 86 and 96 therefor. The journals 90 and 100 on beam 178 or frame 74 are laterally adjustable in slots 289 and 299 respectively in frame members 178. Links may be added or subtracted for chain 123 to adjust the length thereof when adjusting the distance between the rear ends of shafts as 89 and 99. The location of journals as 86 and 90 may also be adjusted to be moved more or less laterally of the slot 80 and then be firmly fixed in position during opertion of the apparatus 30. The distance between the front ends of the axles 99 and 89 of each conveyor and transport assembly, as 35 and 34 is greater than the difference between the rear ends of the axles 99 and 89. The diameter of the curvature of the helical rods, i.e. the length of the transverse members as 191 and 192, is greater at the front end of the helical assemblies as 85 and 95 of assemblies 34 and 35 than at the rear end of such helical assemblies. The difference between (a) the distance between the axles at front and rear is greater than (b) the total change in radius of the helical rods, whereby the distance between the (i) cylindrical surface outlined by the rotation of the helical rods 87 and 88 and (ii) the cylindrical surface outlined by the rotation of the helical rods 97 and 98 decreases from front of each assembly as 34 and 35 to the rear thereof.

Figure 8:
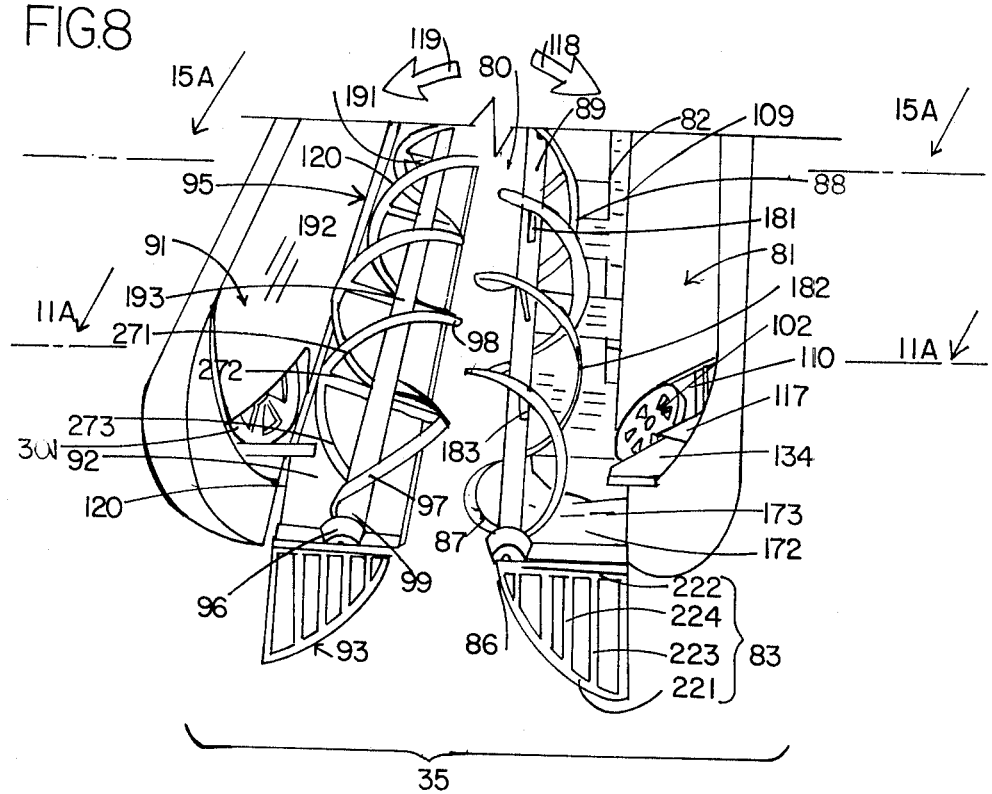
FIG. 8 is an enlarged frontal view looking rearwardly along the slot 80 of the right separator and conveyor assembly 35.

Each helical rod, as 87, 88, 97 and 98 in right hand or right side separator and conveyor assembly 35, and in mirror image like left hand or left side separator and conveyor helical rods of assembly 34 is formed of a firmly connected series of generally like spirally shaped segments, as 271, 272 and 273 as shown for helical rod 98 in FIG. 8.

In view of the decrease in radius from front to rear of the helix 98—and also helixes 87, 88 and 98—each adjacent spiral segment as 271, 272 and 273 extends at generally the same angle to a straight line generally parallel to the axis of the supporting shaft, as 99, for such helix, and is located at generally the same distance from the axis of that shaft. Such straight line lies in the generally cylindrical surface generated by rotation of the helical rod. More particularly, the generally cylindrical surface generated by the rotation of the helical rods is the frustum of a cone, and the generally parallel lines to which the length of the segments bears a substantially constant angular relation are not parallel lines but rather are straight lines which lie in such frustoconical surface and also lie in the same flat plane as does the axis of the shaft, as 99, for such helical rod. Such lines in the frustoconical surface are spaced apart from each other by the same angle in the frustoconical surface as well as by the same angle measured at the axis of the shaft, as 99, for such helical rod. In the above discussion reference is made to spiral or helical segments as 271, 272 and 273 of the same angular length or size, measured at the axis of the shaft 99 for such helical rod or at the frustoconical surface At each position of the plant as 46, in the slot 80, as diagrammatically shown in FIGS. 8, 11-18 and 21-25 these segments of the helices of each of assemblies 85 and 95, provides a continuous series of upwardly moving and downwardly and forwardly sloped inclined smooth round surface, generally 4 to 8 inches long for a 2 foot high plate. Such contact, as shown in FIGS. 21-24 by each segment of such series of segments compresses and—for a fixed angular rate of rotation of the shafts as 89 and 99—moves upwardly at a constant angular speed along each side of the plant. At any one location along the length of slot 80 the speed of each segment of a helix in the vertical direction above the slot 80 is easily kept constant because it is the sum of (a) the constant and regulatable rotation speed of the helix as 87 about its axis, as shaft 89, and (b) the steady forward speed of the apparatus 30 relative to the ground to which the plant is fixed by its roots. At 5 revolutions per second of the helical assembly 85 and a 4 inch radius of helix 87, the upward linear speed of the spiral segments, as 171, 172 and 173 of each helical rod contacting the plant is about 120 feet per second, while, at a forward speed of 3 miles per hour for the apparatus 30 corresponds only to 4.8 feet per second.

When the plant as 46 is compressed by the helical assemblies 85 and 95 it forms a relatively resilient mass, i.e. it springs back to its original shape when released from constraint by assemblies 85 and 95 and exerts an expansive force on the members that contact it and force it into a lesser volume than its original outline occupies. The continual smooth action regularly applied to the plant by the segments of the helixes as 87, 88, 97 and 98 applies smooth upward compressive and tensile or pulling forces to components of the plant contacted, e.g. from position of a rod as 88 shown in FIG. 21 to position of rod 88 in FIG. 24.

Such substantially constant applied forces at a steady rate of rotation of the helical assemblies 85 and 95 of each of the separator and conveyor assemblies 34 and 35 serves to distinguish between (a) flexible plant components, as leaves and branches and stems of immature peppers, which are able to bend or stretch and so withstand such steady forces set at a particular level of intensity by the constant speed of assemblies 85 and 95 and (b) the more brittle stems of mature plants (which are attached to substantially unbendable pepper fruits) and which stems are unable to resist such level or amount of stress, so that only such brittle components are selectively broken.

The mature peppers—whether bell peppers, cayenne peppers or banana peppers—are sufficiently sturdy to be able to be piled 4 to 6 feet high in field trucks as 170 and transported across field and highway without damage to the lowermost of such mass of peppers.

The bell peppers are usually 4–7 inches long and 2 to 5 inches wide and rigid and weigh 2 to 4 pounds while the leaves and stems are flexible, the leaves weighing less than 1 ounce and the stems attached to the leaves and other than the main stems being less than 1/10 inch in diameter.

The journals 86, 96, 90 and 99 may be adjusted so that the frustoconical surfaces generated by rotation of the spirals or helical rods as 87, 88, 97 and 98 rearwardly of the most forward of the transverse as 183 and 193, are tangent to each other from front to rear of assemblies as 85 and 95. This arrangement also provides for applying a different amplitude of agitation and pressure of kneading action on the narrower tops of the plants than at the wider bottoms thereof so that the same stress is applied to the stems at the top of the plant as at the bottom thereof, whereby a sharp distinction is maintained between the action of the apparatus 30 on the stems of the mature pepper plants and on stems of the unripe plants at all heights of the plant.

In operation of the apparatus 30, the guides as 83 and 93 engage and lift the lowest leaves together with the branches attached thereto off the ground to a height above the lowest part of the helical rods as 87, 88, 97 and 98 and then those helical rods engage the bottom portions of the plants. Thereby the lowermost portion of the plants is initially contacted by the helical shafts assemblies as 85 and 95 and a left to right shaking action is successively applied to the plant portions at successively increasing height above the ground while the mature peppers are removed therefrom by those assemblies.

The continuous cooperative rotation of the helical rods push the lower parts of the plant from left to right and back again to provide a shaking action while also to alternately elastically compress and release the plant, as shown in FIGS. 11–18. The amplitude of this shaking action decreases as the height of the zone of contact of plant and helical rods increases because the length of the transverse members as 181–183 and 191–193 decreases from the front end of each shaft as 89 and 99 to the rear thereof. Generally this shaking action causes the relatively heavy and dense peppers as 206 to extend laterally of the less dense leaves while the rolling and compressing action of the helical assemblies as 85 and 95 also provides that the leaves and stems of the plant are alternately released and compressed while pressed upwards.

The maximum space available between the helixes is the sum of (a) the radius of both helices, which is the sum of (i) the radius 185 of inner helix 85 and (ii) the radius 195 of outer helix 95 and (b) the space 199 between the helixes. The actual amount of this space available for the plant in slot varies as the helixes turn, as shown in FIGS. 11–18; thus in FIGS. 11, 13, 15 and 17 the space between the helical bars 181–183 on shaft 89 and the like helical bars 191–193 is the sum of the radii of both helixes plus the space 199 between the helixes. In the position of helix parts shown in FIGS. 11, 13, 15 and 17 this space is elongated parallel to the lines in which the shaft 89 and helical rods 87 and 88 lie and line in which the helical shaft 99 and helical rods 97 and 98 lie. In the position of parts of the helix shown in FIGS. 12, 14, 16 and 18, where the plane of the segments of rods 87 and 88 and helical shaft 89 lie in a plane perpendicular to the plane in which the segments of segment helical rod 97 and 98 and helical shaft 99 lie, the space availabe for the plant is reduced to only the radius of one helix and the space between the helixes. Accordingly the plant is compressed between the helixes in positions as in FIGS. 12, 14, 16 and 18 and somewhat expanded in the position of FIGS. 11, 13, 15 and 17. Additionally, the sides of the plant are rubbed and stretched by the helical rods' upwardly moving helical segments as well as that the portion of the plant above the helixes is bent leftwards in the position of helixes shown in FIGS. 11 and 15 bent rightward in position of parts shown in FIGS. 13 and 17.

The pepper plants are annual bushy perennials about 2 feet high (knee high). The plants are usually planted in rows 3 to 3½ apart the plants 1 to 2½ feet apart in the rows 41 and 42.

The pepper fruits (the peppers) are (a) held by their stems to the plants with the plant end of the stems at locations spaced away from the ground usually 8 to 12 inches and (b) in clusters radially equally spaced or, singly at random in a horizontal plane. The bottom of the peppers are also spaced away from the ground by 4 to 12 inches.

As the apparatus 30 and helical assemblies move into initial engagement with a plant, the elastically compressed plant mass above the helical assemblies as 85 and 95 is moved to one side, the left in FIG. 11 under the force of then leftwardly extending segment of the smooth rounded helical rod or bar as 97 which then smoothly contacts the right hand side of the plant as 46 while the upper left hand helix 87 segment is positioned as shown in FIG. 11, whereby there is provided counterclockwise rotation movement between and above segments of helixes as 87 and 97 and the elastically compressed plant then located in slot 80. This action of the helix segments results in (a) the rapid sideways movement or shaking of the mass of the planes above the helixes toward the left in FIG. 11 and toward right in FIG. 13, with the heavy pepper fruit thrown laterally to the left in FIG. 11 and to the right in FIG. 15 within the loose mass of leaves and stems adjacent thereto above the helix and disentangling or release of the bulky pepper fruit from neighboring leaves and stems above the helices. This leftward and rightward extension provides a limited amount of cracking of the most brittle stems attached to the most mature peppers, inasmuch as the most mature peppers have more brittle stems and the immature peppers have more flexible stems.

As the apparatus 30 and helical assemblies move into initial engagement with plants as 46 and 47 in each row as 42 there is also, at the level of the helices, as shown in FIGS. 11-14, a modification of the outline of each plant with an upward movement of stems and leaves and compaction thereof at and above the vertical level or height of the contact of the plant components and the adjacent segments of helical assemblies. Such outline modification is, as shown by comparison of FIG. 10 and FIGS. 11-14, a narrowing of the lower portion of the plant outline on both sides to match the cylindrical shape of the surface of revolution generated by the helical rods as 87, 88, 97 and 98.

Subsequently thereto, at the level of the rods when the bottom of each rod is located well above the bottom of the plant, i.e. 2 to 6 inches, and while the tops of the rods are still below the level of the top of the plant as shown in FIGS. 15-18, the rods, as 87 and 88 of helix assembly 85 and the rods as 97 and 98 of helix assembly 95 knead or compress and upwardly press the plant mass located between the helix assemblies as shown in FIGS. 15-18 smoothly and continuously.

By the action of the helical assemblies as 85 and 95

Figure 15:
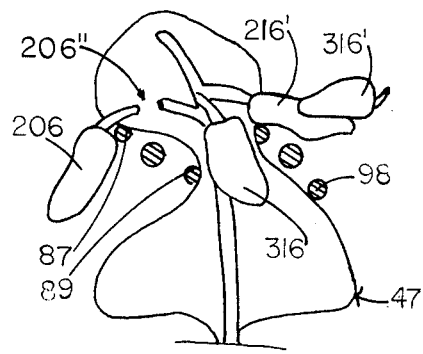
Figure 16:
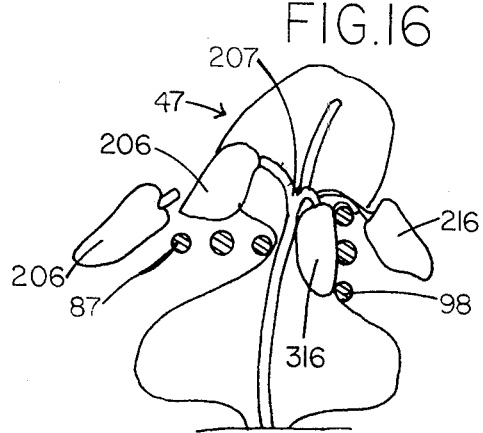
Figure 17:
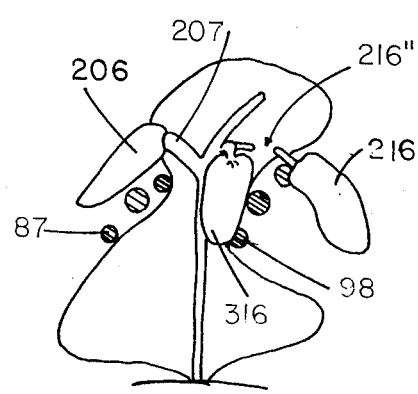
Figure 18:
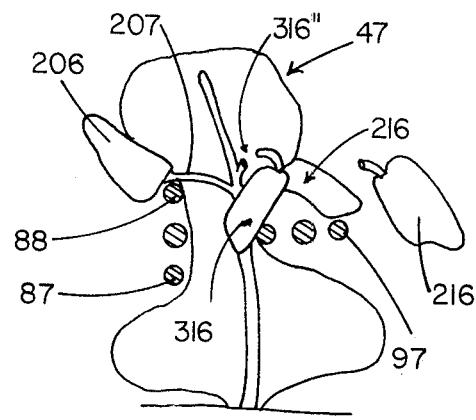

(1) the brittle stems as 207 of mature fruits as (a) 206 in FIGS. 17 and 18 and (b) 216 in FIGS. 15 and 16 are selectively broken as at (a) 206″ in FIG. 15 and (b) 216″ in FIG. 17, respectively;

(2) The separated mature fruits are thereafter moved laterally from th plant as at (a) 206′ in FIG. 16 and (b) 216′ in FIG. 18, respectively, to the adjacent floor plate of apparatus 30;

(3) Where the stems of such fruits are resilient and so selectively not broken, the immature fruit attached to such stems are held to the plant as at (a) 206 in FIGS. 16 and 17 and (b) 216 in FIGS. 18 and 15;

(4) Fruits as 316 in FIGS. 15 and 16 initially located between the helical assemblies and/or not initially lateral of helixes are smoothly pushed upwardly by the helixes, as at FIG. 17, and the brittle stems of mature plants selectively ruptured, as at 316″ in FIG. 18 and such separated fruits are engaged by the upwardly moving adjacent helix segments and moved upwardly and laterally as at 316′ in FIG. 15; and (5) As the plant mass had been previously loosened by the shaking action earlier applied, other mature fruits located between the helical assemblies as 85 and 95 as pepper fruits as 316 in FIG. 17, are smoothly moved laterally to positions as 216 in FIGS. 18 and 15 and their stems selectively torn as at 216″ in FIG. 17; where the stem of such fruit as 316 is resilient, as on immature fruit, and not broken such fruit maintains its connection to the plant at 206 in FIGS. 16 and 17 and/or 316 or 216 in FIG. 15.

The rearward decrease in distance between the shafts as 89 and 99 of each assembly as 34 and 35 accommodates to the difference in volume of the plant mass handled from front to rear of assemblies 34 and 35 and the decrease in helix diameter as helices 87, 88, 97 and 98 decreases the speed of each helical segment contacting the plant mass from the front of the assemblies 34 and 35 to the rear thereof.

FIGS. 21-24 diagrammatically illustrate the compressive and pulling action continuously applied by the helical rods on the mass of the plant within the outline thereof. The forces at positions shown in FIGS. 21, 22, 23, and 24 correspond to the position of the helical rod shown in FIGS. 15, 16, 17 and 18 respectively. Upward tensile forces are provided at points indicated as "t" while compressive forces are indicated at points indicated as "c". As illustrated in FIGS. 21-24, all position in the action of assemblies 85 and 95 on the plant mass, such compressive and tensile forces are continuously applied. The assemblies 34 and 35 of apparatus 30, as shown in FIGS. 21-24, thus provide (a) continuous application of forces to the plants treated to concurrently maintain the elastic mass of such plant within the outline of such plant under a steady range of pressure while and by sideways bending and shaking successively elevated portions of the plant and also (b) applying smooth, controlled and equal pulling action on the body of each of the peppers relative to the stems therefor and thereby breaking only the more brittle stems of the more mature pepper fruit and so selectively removing the more mature peppers from the plant. In the operation of assemblies 34 and 35 of apparatus 30 the upward pulling action of the smooth helical rods depends on the compression of the elastic plants mass. The compression of the plant mass is maintained at a substantially constant value by arranging the helical segments that contact opposite sides (left and right) of the plant to be closer to each other and move more slowly as the plant horizontal cross-section decreases with increasing height; thereby the smoothly applied forces selectively break the brittle stems holding the more mature peppers because the force applied to the plants is smooth and can be and is controllably increased or decreased as needed.

The stems of peppers are also engaged by segments of the helix rods as 87 by directly engaging the fruit stems and pulling on them smoothly, due to the helix shape. The brittle mature stems are broken thereby but the more flexible immature stems do not break, as the fruits had been earlier loosened from neighboring branches and leaves by the shaking action earlier applied to such pepper fruits while those pepper fruits were located above the helical rods during the initial contact of helical assemblies (as 85 and 95) of both like separator assemblies 34 and 35 with the plants treated. The actions of each such inner helical rod segments breaks the mature stems and throws such stems and pepper fruit attached thereto in counterclockwise direction outward to the inner wall 81. Such peppers fall to floor 82 and are carried upward on the inner floor plate by one of the series of the drag line plates. The peppers on the right hand side of each plant as 46 in zone 80 are similarly separated from the plant and are thrown toward the outer wall 92 of the separator and conveyor assembly 35 and fall to the floor 92 thereof and are moved upward by the plates of the drag plate assembly to the transverse conveyor. The slots as 171-173 on such floors 82 and 92 provide for separation of dirt that may have been separated from the plant by the throwing or thrashing action of the helixes on the plants contacted thereby.

The operator 37 seated on seat 38 may not only readily see the overall action of the helices on the plants and direct apparatus 30 to engage pairs of rows as 41 and 42, of the plants, but also the operator may see the product on the cleaner plate 141, and determine if those peppers are underripe, in which case the speed of the helix may be decreased or if the product on the transverse coveyor does not have an adequate proportion of mature fruits thereon, whereupon the blade speed is increased.

This action of the apparatus 30 provides that the peppers are separated from the plant without harm or damaging action on the peppers, but with a pulling action on the stems and by utilizing the inertial and mass characteristics of the mature peppers to position them so that the helical rods may selectively break the stems to which such peppers attach. No damaging action occurs directly on the pepper as might bruise them, as the helical shafts contact the stems smoothly and evenly. Accordingly there is no collection of pepper juice resulting from bursting of the peppers on the floors or walls nor drag plate blades of the separator and conveyor assembly 34 or 35. Accordingly dirt and grit do not collect on the peppers' walls and the surface of the peppers are not damaged by movement of the peppers along the floor plates as 82 and 92 after the separating action from the plant. The distances between the axes of the shafts as 89 and 99 may be varied at the rear plate 178 to accommodate for larger size plants or smaller size plants in a given field. Additionally, the speed of rotation of the helical shafts is independently variable to accommodate to the maturity and brittleness of the stems of the pepper plants in each of the rows, as 41 and 42, treated by apparatus 30 because apparatus 30 has, for motors 121 and 246 at console 240 separate control for the speed of the helical shafts 89 and 99 on the right hand separator and conveyor assembly 35 and for like shafts on the left hhand separator and conveyor assembly 34 respectively. As this speed control may be accomplished while in the field so that the plants harvested are not damaged by this harvesting action, the plants initially treated by apparatus 30 may be harvested again. The pulling which is applied to the stems and the fruits, which stems are initially sufficiently immature and flexible to not be severed by the beating action of the helical rods, does not harm the plant; to the contrary, helices 34 and 35 provide a treatment which stimulates the growth of such peppers and permits harvesting of such pepper plants by passage of the apparatus 30 along such plants at a later time when their fruits are more mature and their stems more brittle.

As the plant thickness decreases with height of the plant from the ground the amplitude of the rocking action decreases with plant height but as the folige of the plants have less thickness and/or width with increasing height the effect on the pepper fruits supported at the upper end of the plants is susbstantially the same as the rocking effect movement effect on the fruits carried by the lower thicker portions of the plants. Accordingly the rocking action which causes extension of the fruits from the outline of the plant and facilitates engagement of the helical rods with the stems of the fruits, is the same at top as it is at the bottom of the plants because of regularly decreased radius of the helix units with progressive rearward location of the helix segments.

The cleaner conveyor and screen assembly 33 comprises a transverse cleaner screen 145, a transverse conveyor 142, and a cleaner plate, 141. The cleaner plate 141 is a smooth surfaced rigid imperforate horizontal plate firmly attached to parts of the frame 31 and generally extending rearwardly of the separator and conveyor assemblies 34 and 35. The front edge of the plate 141 is straight and extends to and is attached to a transverse frame member on which assemblies 34 and 35 rest and located forwardly of the rear end of floor plates as 82 and 92 of the right separator and conveyor assembly 35 and also forwardly of the rear end of the corresponding floor plates of assembly 34. The left hand edge 148 of the plate 141 does not reach to the left hand frame member of frame 31, but is separated from that frame member by a left transverse cleaner plate discharge slot 149.

A transverse conveyor 142 comprises a transversely extending pair of parallel front and rear chains 155 and 156 which supports a parallel set of equispaced like drag plates, one portion of which set, 143, is on top of the plate 141 and another portion of which set extends below plate 141 and forms a lower set, 144, of drag plates which traverse the upper surface of the transverse screen 145. A motor 140 actuates drive sprockets for each of the continuous drag link chains 155 and 156. Slot 149 is a horizontally extending rectangular slot located on the left hand edge of plate 141 adjacent to the frame 31. The transverse cleaner screen 145 is firmly attached to the frame 31 below plate 141 and is composed of a series of closely spaced parallel bars 147 that extend transversely to the length of frame 31—or may be a screen that includes such components—with narrow slots as 146 between such bars or like screen components. The lower portion 144 of the set of drag plates of transverse conveyor 142 extends downwards to and slidably contacts the top of screen 145 and moves from left to right over that screen.

The portion 143 of the drag plate set on top of cleaner plate 141 moves from right to left thereover and in sliding contact therewith. The drag plates of portion 143 move peppers gathered from discharge of assemblies 34 and 35 toward the slot 149 and also serve to evenly distribute such peppers relatively evenly over the front-to-rear length of the horizontal cleaner plate 141 while such drag plates move from right to left over plate 141 and thereby evenly distributes such peppers along the length of slot 149 and thereby evenly feed such peppers to the screen 145 below such slot. The cleaner screen 145 extends further to the left than does the cleaner plate 141 and collects all the discharge moved leftward to slot 149 from plate 141. The slots as 146 in screen 145 provide that dirt and debris smaller than the peppers gathered from assemblies 34 and 35 fall away from the peppers and are thereby separated therefrom. The lower portion 144 of the set of drag plates of the transverse conveyor 142 moves from left to right in slidable contact with the top of screen 145 and moves the gathered peppers into hopper 168 for the discharge conveyor 32.

The discharge conveyor and frame assembly 32 comprises a discharge assembly frame 161, a pluraltiy of like buckets, as 162, 163 and 164, chain drive unit 169, a discharge spout 165, positioning control rods 166 and 167, a feed hopper 168, a motor 160, and a portion of the control console 240. The frame is pivotally attached to the right side frame members and is controllably positioned by extension or retraction of the hydraulic control rods 166 and 167. A chain drive is attached in conventional manner to the frame 161 and moves the buckets as 162-164 upward from an upwardly open feed hopper 168 to a discharge spout 165. The discharge spout extends laterally from the frame 161 and delivers product from the buckets to a gathering truck 170 which moves parallel with and nearby to the apparatus 30 along the field 40 from which the peppers are harvested. The feed hopper 168 is a rigid open topped receptacle or bucket with closed sides and bottom with its open top located directly below the right hand end of screen 145 and serves to collect all the peppers discharged from the top surface of that screen.

Figure 19:
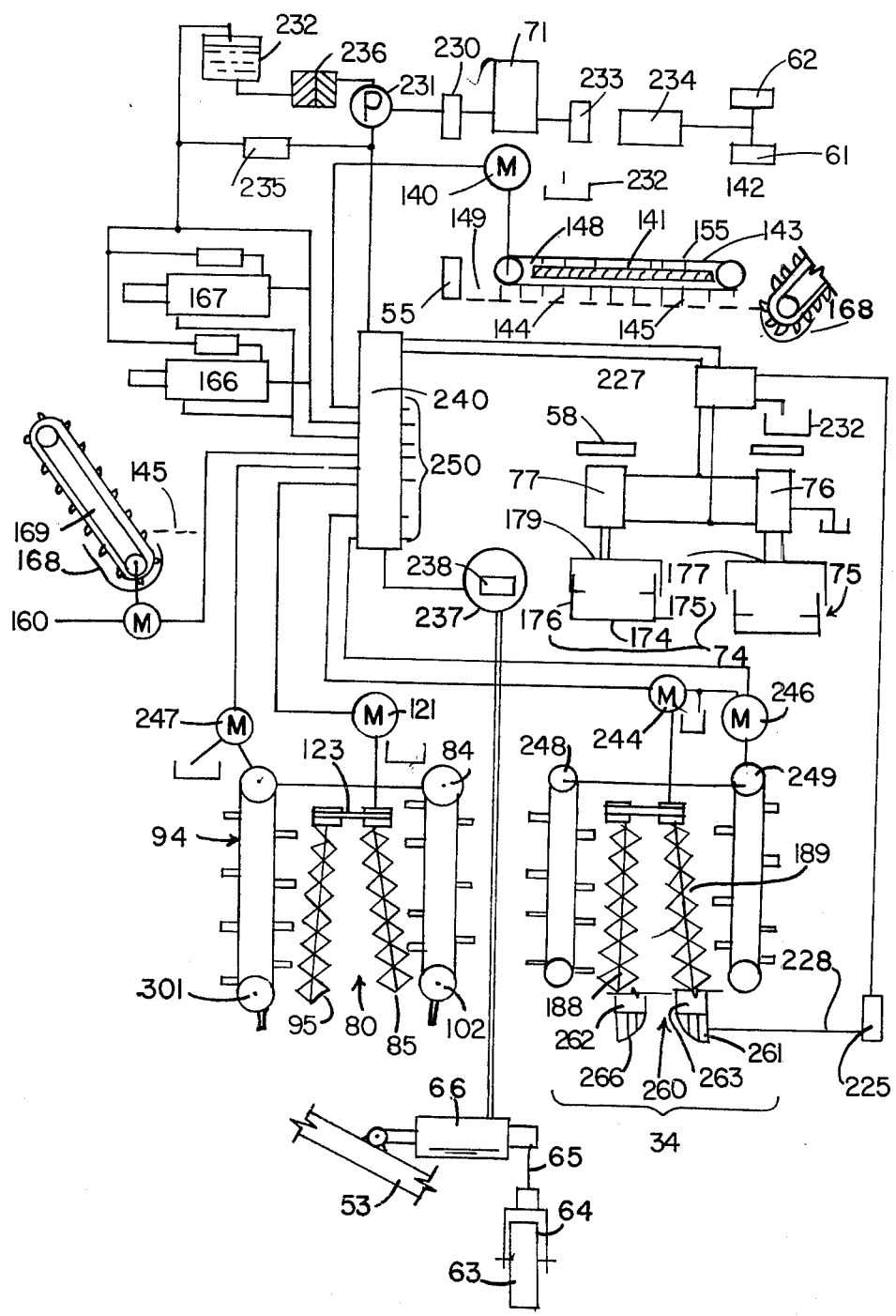
FIG. 19 is a diagrammatic presentation of the power and control system 36 of the apparatus 30 and shows a diagrammatic vertical cross section of assembly 33 as seen along vertical section 19A—19A of FIG. 3.

Portions of assembly 33 are diagrammatically shown in FIGS. 3, 5 and 19; portions of assembly 33 shown in FIG. 19 are diagrammatically shown as seen along the section 19A—19A of FIG. 3.

The power and control assembly 36 is shown diagrammatically in FIG. 19 and comprises the engine 71, a principal pump 231, motors 244 and 246 for the assembly 34, motors 121 and 247 for assembly 35, motor 140 for the cleaner conveyor and screen assembly 33, motor 160 for the discharge conveyor and frame assembly 32, and positioning pistons 66, 76, 77, 166 and 167 as well as a hydrastatic drive motor 234 for the wheels 61 and 62 and a control console 240.

The motor 71 is an internal combustion engine connected by a clutch 230 to a hydraulic pump 231. The pump 231 is fed by hydraulic sump tank 232 which has a discharge line which passes through a filter 236 to the intake of the pump. A standard pressure relief valve 235 or other standard overload apparatus for regulating the pressure is provided between discharge of the pump 231 and the inlet line to the sump 232. The motor 71 also is connected by a clutch 233 to a hydrostatic drive 234 which is connected by conventional means to the rear drive wheels 61 and 62. The outlet or discharge of the pump 231 feeds to a control console 240 located on the operator's platform 257. That operator's platform is firmly attached to the frame 31.

Frame 31 is mirror image symmetrical about its vertical center plane, located between the left front horizontal member 57 and the right front horizontal member 52 and passing through the center of the front wheel fork journal 67, although only all left side members of frame 31 are fully shown in the drawings. A set of control arms 250 on the console 240 is within convenient reach of an operator as 37 seated on an operator's seat 38, which seat is also firmly attached to the platform 257 and cleaner plate 141 is in line of sight thereof.

Console 240 and a control arm in set 250 connects by hydraulic lines to the pistons 166 and 167 to extend and retract the frame 161 of the discharge conveyor assembly 32. The console also provides control connections from the pump 231 to the motor 160 which drives the continuous belt 169 to which the buckets as 162-164 are attached.

The console 240 also connects, through the adjustable control arms in set 250 thereon, to the motor 121 which drives the vehicle assemblies 85 and 95 of assembly 35. Speed control is provided at the console 240 for such motors. Additionally the console 240 is operatively connected to a motor 247 which is operatively connected to the drag plate assembly 84 of the right separator and conveyor assembly 35 and also to a right outer drag plate assembly 94. The drag plate assembly 94 is a mirror image of the right inner drag plate asembly 84.

The console 240 also transmits hydraulic power to a motor 244: the motor 244, like the motor 121, is a variable speed hydraulic motor and the speed thereof is varied at the console 240 by the operator 37. The motor 244 is operatively connected to inner and outer helical assemblies 188 and 189 which correspond respectively to and are mirror images of the inner and outer helical assemblies 85 and 95 of the right hand separator and conveyor assembly 34, and operate similarly to the helical assemblies 85 and 95.

The console 240 is also operatively connected by hydraulic lines to a variable speed motor 246 which is operatively connected to the left outer drag plate assembly 149 and the left inner left drag plate assembly 248. The left inner drag plate assembly 248 is a mirror image of right inner drag plate assembly 84 on the right separator and conveyor assembly 35 and the left outer drag plate assembly 249 is mirror image of and operates similarly to the right outer drag assembly 94 of the right separator and conveyor assembly 35.

The left hand separator and conveyor assembly 35 is provided with a frame 75 and that frame 75 supports a left inner wall 187 and a left outer wall 186 in the same way the frame 74 supports a right inner wall 81 and a right outer wall 82 of right separator and conveyor assembly 35.

The left separator and conveyor assembly 34 is provided with a left inner floor plate unit member 262 (like the right inner floor plate 82), and a left outer floor plate 263 (like the right outer floor plate 92). A rigid left inner guide 266 like the front right inner guide 83 is attached to the front of the left inner floor plate 262. The left outer floor plate 263 is provided with a guide 261 like the right outer guide 93 but the guide 261 is flexibly connected to the front floor plate 263, while 83, 93 and 266 are firmly attached to floor plates.

A sensor 255 is connected to outer, left, side of the left assembly rigid outer wall 186. A rigid control rod 228 pivotally connects the left outer guide 261 to the sensor 225 to indicate the position of that left outer guide 261; control unit 225 connects to an automatic level control 226. The automatic control 226 is connected by hydraulic lines to the console 240. The sensor applies a hydraulic signal to automatic control 226 and control 226 automatically applies hydraulic power to the pistons 77 and 76 to raise and lower the front end of assemblies 34 and 35 relative to the ground over which the apparatus 30 travels. Such raising and lowering is thereby done automatically. Additionally the operator may manually control the level of the front end of asemblies 34 and 35 through the handle 227 as the automatic level control 226 has a hand control 227 as well; that manual control handle 227 is located at the console 240. The control 227 is connected to the pistons 77 and 76 to raise and lower the support beam 179 for the right separator and conveyor assembly 35 and to the control piston 76 to raise and lower the left transverse support member 177 for the left separator and conveyor assembly 34. The sensor 225, in view of an adjustment nut on the rod 228, which provides for adjustment of the length of the rod 228, provides for automatically raising and lowering the assemblies 35 and 34 and automatically maintaining the guide plates as 82, 83, 266 and 261 in a sliding contact with the ground over which it travels so as to smoothly engage the plants as in rows 41 and 42.

The console 240 is also operatively connected by hydraulic lines to a steering wheel valve 238 which is controlled by the steering wheel 237 on the platform 257. The valve 238 transmits hydraulic power to the steering control piston 66 which piston is operatively attached to the steering arm 65 for the fork 64 of the front wheel 63.

The console 240 is also operatively connected to a motor 140 which motor is firmly attached to frame 31 and drives the transverse cleaner conveyor 142 at a variable speed which variable speed is controlled by the operator 37 of the apparatus 30.

The spacing of the drag unit plates as 104-106 and 108 along the cable therefor, as 103, is the same as the spacing between the parallel transverse bars as 181-183 of the adjacent helical assembly, as unit 85. Thereby the drag plates are located at the same position relative to the position of the parallel helical rod segments at all points along the length of the upwardly directed path 135 of those drag plate units. Accordingly the drag plate units and the helical rods have the same relation of the location of the helical segment neighboring to or parallel the drag plate units along the full length of the path 135. This is the case for both inner and outer drag plate units 84 and 94 in the right separator and conveyor assembly 35 and also for the like units 248 and 249 on the left separator and conveyor assembly 34.

By the control arms as 250 on the console 240 the operator 37 may control the speed of each of the movable units of separator and conveyor assemblies 35 and 34 as desired as well as manipulate and operate the discharge conveyor 32 and the cleaner conveyor screen assembly 33 as well as driving the wheels 61 and 62 and control the steering of apparatus 30 through the front steering wheel 63. Each of the arms in the control arm set 250 provide for maintaining steady the setting of the valves to each of the motors of the assembly 36 as well as controlling and fixing the positions of various pistons as 166, 167, 76 and 77 and 66.

The impact of the helical rod segments as 271 and 272-273 of each of the helical elements 87, 88, 98, 99 is applied against the mass of the plant as 46 while that mass is resiliently held by the assemblies as 85 and 95. Accordingly the effect of breaking off a pepper stem or not breaking off a pepper stem depends upon the brittleness of such pepper stem —which in turn depends on the maturity of the pepper fruit—and the force applied as structures contacted by the segments of the helical rods other than the mature pepper fruit and the mature pepper stem are flexible. The impact of the helical rod is controlled by the operator who is able to raise and lower the speed of the rotation of the helical assemblies as 85 and 95 depending on the quantity and condition of the product visible on the cleaner plate 141 to such operator. Thereby a discrimination of mature and immature fruit based on the condition of brittleness of stem is readily effected by this apparatus.

The decrease in the diameter of the helices as 87, 88, 97 and 98 from the front of such assemblies to the rear thereof provides that the same intensity of treatment of a plant between helical assemblies as 85 and 95 is provided to the top portions of plants at the rear of the helical assemblies 85 and 95 as the more forward ends of such assemblies apply to the lower plant poritons.

In the preferred embodiment of apparatus, the shafts 98 and 99 of assembly 34 as well as 35 are each formed of ½ inch cold rolled steel and are 6 feet long from front journals as 86 and 96 to rear journals as 90 and 99. The transverse bars as 191, 192 and 193 are all equally spaced along the shaft 99 (and like bars 181, 182 and 183 likewise spaced along shaft 89) at the same 8 inch intervals. The drag plates as 102, 103 and 104 are also spaced at the same 8 inch interval along cables as 103 as the neighboring transverse bars as 181, 182 and 183 are spaced along shafts as 89 to maintain a constant spatial relations of the segments of the helical rods and adjacent drag plate during rotation of the rods and the concurrent upward and rearward path of the drag plates and peppers urged and moved upwardly and rearwardly thereby along a given floor plate as 82. The length of the transverse bars as 181, 182, 183 decreases from 4½ inch radius at the front of the most forward of the transverse bars as 193 and 183 to 3 inches at the most rearward of the transverse bars on each helical support shaft as 89. The spacing between the frustoconical surface outlined by the rotation of the helixes 87 and 88 and the frustoconical surface outlined by the rotation of the helixes 97 and 98 decreases from one to two inches at the most forward bars, as 183 and 193 of helical rod assemblies 85 and 95 to 0 to ¼ inch at the rear and of assemblies as 85 and 95.

Motor 121 is directly connected to shaft 89 and its support bracket sprocket on that shaft drive chain 123 and powers and controls the motion of shaft 99 to keep those shafts in fixed phase relation to each other.

Motor 121 for the helical rod assemblies 85, 95 and the motor 247 for drag plate assemblies 94 and 84 of each separator and conveyor assembly as 35 may be substituted for by one motor and a single driving and timing chain connected therebetween whereby such assemblies 85, 95, 94 and 84 are automatically kept in synchronization to provide the cooperating and phase relations between them as above described.

Figure 20:
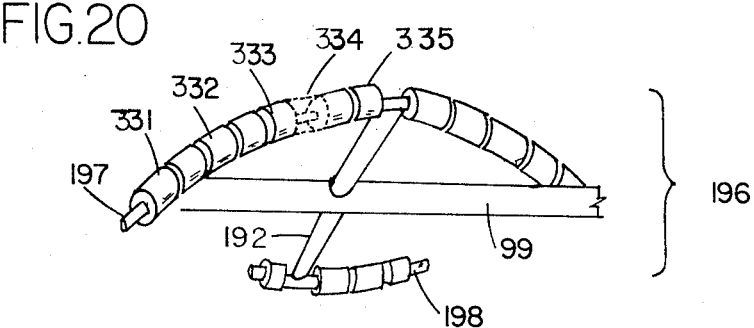
FIG. 20 shows another embodiment of helical rod unit used in helical assemblies as 85 and 95 of apparatus 30.
Figure 21:
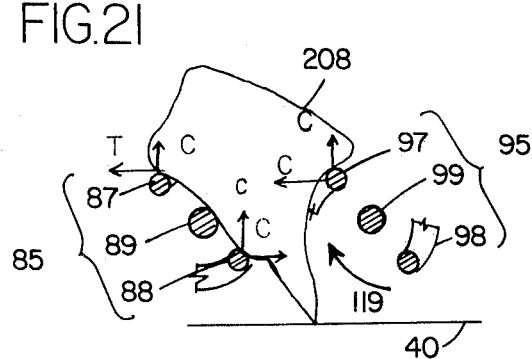
FIGS. 21-24 diagrammatically illustrate the compressive and pulling actions continuously applied by the helical rods on the mass of a plant treated thereby. The canopy 258 on platform 257 shown in FIG. 1 is not shown in other figures for purpose of clarity of showing of the details in the other figures.
Figure 22:
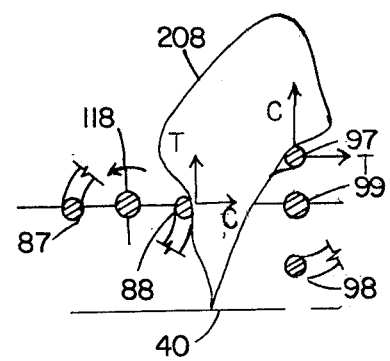
Figure 23:
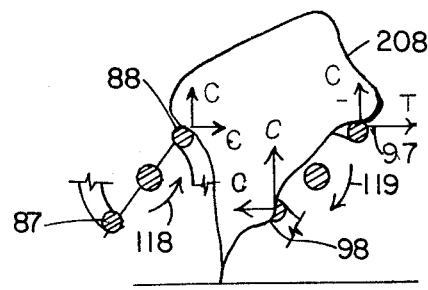
Figure 24:
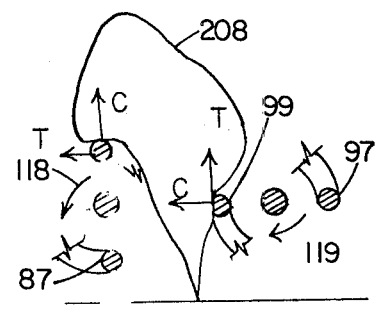

In another embodiment of helical assembly such as 196 shown in FIG. 20 the solid spiral round-sectioned rods as 97 and 98 of each of the helical assemblies as 95 are replaced by a pair of like rigid spiral rods as 197 and 198 each of which also rotatably supports a plurality of rollers as 331-335 to provide substantially continuous smooth cylindrical surfaces concentric with and rotatable about the spiral segments of each rod as 197 and 198 between supports as 191-193 rather than the rigid surface which is provided by the round rods such as 97 and 98 (one roller, 334, is shown in dotted lines to better illustrate the structure shown). Accordingly all the assemblies as 95 may be substituted for by the assembly 196. Each such assembly as 196 has the same central shaft 99 and the same size and arrangement of the transverse helical support members 191, 192 and 193 as in assembly 95 and is operated as above described for such assembly 95.

Inasmuch as the treatment applied to the plant as 46 and 47 by the apparatus 30 is flexing and bending and kneading action that is smooth or even and readily controlled by the operator to selectively rupture only the relatively brittle stems of pepper fruits the plants are not damaged or cut, and, when released by the helical assemblies as 85, 95, 188 and 189 the plants resume their original shape and outline and continue to grow and mature. Accordingly, following an initial treatment of a plant as 46 and 47 in each of the rows as 41 and 42 by apparatus 30 the plants from which the mature peppers had been selectively taken as above described (and which peppers are transported by assemblies 33 and 32 to the collecting truck 170) remain in the field and grow and the pepper fruits thereon that were so immature that they were not removed from the plant by the first operation thereon by apparatus 30 continue to grow. The apparatus 30 is, after such futher growth of the plants, used as above described to again treat the same rows as 41 and 42 and plants as 46 and 47 and again selectively remove the mature fruits from those plant, and again leave the plant in the field for further growth of immature fruit thereon and later harvesting of the mature fruits by the apparatus 30. The helical assembly support shafts as 89 and 99 usually extend at an angle of 30 degrees to the horizontal + or − 5 degrees, depending upon the height of the hillocks as 48 on which the plants are grown relative to the furrows as 43-45 in which the wheels of the apparatus 30 travel. The FIGS. 1, 2, 4 and 8 are pictorial and dimensions may be approximated therefrom in view of other quantitative data above given.

The steady upward component of forces applied by the constant or set speed of rotation of the helical or spiral rods as 87, 88, 97 and 98 to the entire elastically compressed plant mass, as shown in FIGS. 11-18 and 21-25, not only provides forces that discriminate between the stems of mature and immature fruits, but also utilizes the lower portions of the plant, e.g. leaves and stems, to form an effective although imcomplete envelope or container or carrier for the pepper fruits thereabove and helps to hold or contain such separated fruits when the upward force of the helical assemblies as 85 and 95 on the mature fruits causes rupture of the brittle stems for such fruits. Also, the lateral movement and urging action of the cooperating helical segments on the plant, as shown in particular in FIGS. 11-18, following such compression and upward urging by the upward component of forces applied to the elastically compressed plant mass assists sideways movement of the separated fruit toward the floor plate on which such separated fruit is then carried upward by the neighboring drag plate assembly The smooth rounded surface of the helical or spiral rods as 87, 88, 97 and 98, reduces pulling on the plant leaves and stems and the rotatable smooth surface of the apparatus shown in FIG. 20 limits and minimizes the tensile forces applied by the cooperating helical assemblies as 85 and 95 to the plant mass surfaces and so improves the smoothness of action thereof in the discriminating action thereof between mature and immature fruits.

While the process herein set out has been particularly described in relation to bell peppers, and the separation of mature bell pepper fruits from bell pepper plants, the process applies also to other pepper plants and fruits and also to other plants and their fruits.

The paddles or plates as 338 and 104-106 are rigid flat vertically extending plates, as 302, with longitudinally extending locating and ribbing elements as 304. The vertical portions of each of the paddles or plates, as 302, extend (a) from near slot as 109 and 102, and the clamps, as 107 and 137, which attach to the cables as 103 (b) to close to the slot 80, as shown to scale in FIG. 8: such plates extend from the cable as 103 to which attached toward the slot 80 at a slightly acute rearwardly and upwardly open angle of 85-75 degrees.

Figure 9:
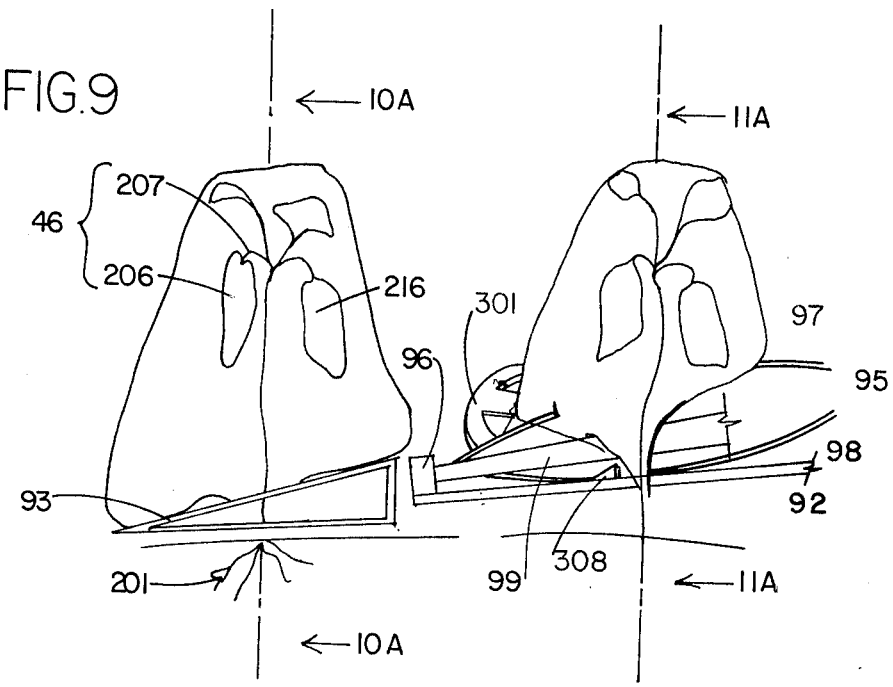
FIG. 9 is a longitudinal diagrammatic vertical section along section 9A—9A of FIG. 10 showing two plants, 46 and 47, during initial stages of operation of the apparatus 30 thereon.

As shown in FIGS. 8 and 9 the wheel 301 of outer plate assembly 94 and wheel 101 of inner drag plate assembly 84, which wheels are rotatably supported on frame 74 of assembly 35, are located sufficiently close to the ground that the most forward paddle or rigid plate as 308 (like plates 102-104 of assembly 84) contacts the floor plate therefor near the front end the near of that floor plate as 92. The front end of the floor plates, as 82 and 92, are very close to the ground, i.e. only ½ to 1 inch thereabove, so that the guides as 83 and 93 therefor may readily engage and pick up all movable portions of the plants lying on the ground and transfer them to the floor plates therefor as 82 and 92. The lowermost paddles, as 308, engage all peppers early disengaged by assembly 35 from the plant on which grown and later carry them upward along the floor plate as 82 and 92 with the leaf and stem portions of the plant that lie on the floor plates as 82 and 92: the flexible portions—as the leaves and the stems attached thereto—of the plants initially located in slot 80, and which flexible portions are, in the early stages of contact of the assembly 35 and the plant, supported or located on plates 82 and 92, later easily pass through the slot as 80 and continue their connection with the ground and remainder of the plant on which grown while the apparatus 30 moves along direction 39 past the plant and while the separated pepper fruits are maintained on the plates as 82 and 92 and moved rearwardly and upward along those plates by the paddles or plates as 338 and 104-106 to the cleaner plate 141.

I claim:

1. A traveling field harvester comprising a wheeled support frame assembly, a discharge conveyor and frame assembly, a cleaner conveyor and screen assembly, a left separator and conveyor assembly, a like right separator and conveyor assembly, and a power and control assembly, said frame assembly supporting said other assemblies thereon, said power and control assembly operatively attached to each of said other assemblies, each separator and conveyor assembly comprising a frame, an inner rigid vertical inner wall, a slotted inner rigid floor plate, a front inner guide, an inner drag plate assembly, an inner helix assembly, a vertical outer wall, a slotted outer rigid floor plate, a front outer guide, an outer drag plate assembly, and an outer helix assembly and a longitudinally extending and a separator assembly slot, the inner floor plate extending laterally from said inner wall to an inner floor outer edge and the outer floor of the separator and conveyor assembly extends inward to an outer floor inner edge said floor edges separated from each other by said longitudinally extending separator and conveyor assembly slot, said drag plate assemblies are located above the floor plates and the helical assemblies are located above the slot and above upwardly moving portions of the drag plate assemblies, each respective inner and outer floor and each inner and outer wall of said separator and conveyor assembly separated by a drag unit plate slot between the bottom of the wall and the top of the edge of floor plate distant from said slot, each drag plate assembly comprising a drag plate assembly top wheel, a bottom drag plate assembly wheel, a drag plate cable, and a series of like drag plates, each drag plate assembly top wheel near the rear of each vertical wall, a bottom drag plate assembly wheel near a front end of each vertical wall of a separator and cleaner conveyor assembly, said cable trained over said wheels, each drag plate firmly attached to clamps therefor, and the clamps firmly attached onto said cable, said guide plates located in series in one path located immediately above the floor plate and another, higher, return path located in a drag unit plate compartment on a side of each said vertical wall opposite to said slot and said drag plate assembly is operatively connected to said power and control assembly, each helix assembly comprising a front helix journal, a first helix, a second helix and a rigid helix support shaft, a rear journal, the helixes on one side of said slot formed counterclockwise rearwardly, the helixes on the other side of the slot formed clockwise rearwardly, and said support shaft is a rigid cylindrical shaft on which are located and supported said first and second helixes, said shaft rotatably supported in said front helix journal and on said rear journal those journals firmly attached to said floor and to said frame, the upper end of each shaft connected to a motor of said power and control assemblies, and wherein each helix assembly comprises a plurality of longitudinally spaced apart rigid transverse bar supports, connected at their inner end to the helical support shaft and at their outer end to one of said helixes and the transverse bar supports attached to said helix support shaft of the outer helix assembly all lie in the same flat plane and the transverse bar supports attached to the helical shaft of the inner helical ssemblly lie in a flat plane, the plane in which the transverse bar supports of the inner assembly lie is perpendicular to the plane in which the transverse bar supports of the outer assembly lie, and said transverse bar supports on each shaft members are all located at the same longitudinal spacing distance from each other on both helix support shafts, and the distance between the front ends of the helix support shafts of each conveyor and transport assembly is greater than the distance between the rear ends of said shafts and the lengths of the transverse bar supports are greater at the front end of the helical assemblies than at the rear end of such helical asemblies and the segments of each of said helixes is located in the surface of a frustum of a cone and the support shaft extend along the axes of said frustoconical surface and said axes are located in a forwardly and downwardly inclined horizontally extending flat plane and each helix is a rigid round-sectioned spirally wound rod.

2. An apparatus as in claim 1 said cleaner conveyor and screen assembly comprising a transverse cleaner screen, a transverse conveyor and a cleaner plate, the cleaner plate being a smooth rigid horizontal plate firmly attached to parts of said frame, the front edge of said plate is located forwardly of the rear end of said floor plates of the separator and conveyor assemblies and an edge of said plate does not reach to the frame and is separated from that frame by a cleaner plate discharge slot, and said transverse conveyor comprises a set of transversely equispaced like drag plates, one portion of which is set on top of the cleaner plate and another portion of which set extends below said cleaner plate and forms a lower group of drag plates which traverse the upper surface of the transverse cleaner screen and said screen extends below said cleaner plate discharge slot, and an operator support on said wheeled support frame assembly and located above said cleaner plate and a control means for said power and control assembly, the top of said cleaner plate being in the line of sight of said operator support, and said control means being in proximity to said opertor support, and said control means being operatively connected to said power and control assembly.

3. Apparatus as in claim 1 wherein the difference between (a) the distance between said support shafts at their front and rear is greater than (b) the total change in radius of the helixes, whereby the distance between the (i) cylindrical surfaces outlined by the rotation of the helixes on one side of said slot and (ii) the cylindrical surface outlined by the rotation of the helixes on the other side of said slot decreases from the front of each separator and conveyor assembly to the rear thereof.

4. Apparatus as in claim 1 wherein each of said helical assemblies comprises a series of like rollers each roller having an exterior smooth cylindrical surface, each roller rotatably mounted on a segment of said spirally wound rods and being concentric therewith, and said series of rollers forming substantially continuous smooth rotatable surfaces between said transverse bar suppoort bars connected to said spirally wound rods in each of said helical assemblies.

5. A process of harvesting pepper fruits from a plant comprising the steps of engaging and lifting the lowest leaves of said plant together with the branches and fruit attached thereto off the ground and initially contacting the lowermost portion of the plants by a pair of forwardly moving continuously oppositely rotating spirally wound rigid rods the segments of each which lie in a frustoconical surface narrowing from front to rear and a left to right shaking action is successively applied to the plant portions at successively increasing height above the ground while the mature pepper fruits are selectively removed therefrom.

6. Process as in claim 5 including step of (a) continuously maintaining the elastic mass of such plant initially within the outline of such plant under a steady range of pressure while and by sideways bending and shaking successively elevated portions of the plant and (b) smoothly applying upward and lateral forces on the body of each of the pepper fruits relative to the stems therefor and thereby breaking only the more brittle stems of the more mature pepper fruits and so selectively removing the more mature fruits from the plant.

7. Process as in claim 6 including the step of pushing the lower parts of the plant from left to right and back again to provide a shaking action while also alternately elastically compressing and releasing the plant, and the amplituide of such shaking and compressing action decreases as the height of the zone of contact of plant and said spirally wound rods increases.

8. Process as in claim 7 including the steps of releasing the plant after completion of said process and, after a period of time during which said plant grows and its fruit mature, repeating said process on said same plant.

9. A process of harvesting fruits from a plant comprising the steps of engaging and lifting the lowest leaves of said plant together with the branches and fruit attached thereto off the ground and initially contacting the lowermost portion of the plants by a pair of forwardly moving continuously oppositely rotating spirally wound rigid rods the segments of each which lie in a frustoconical surface narrowing from front to rear and a left to right shaking action is successively applied to the plant portions at successively increasing height above the ground while the mature fruits are selectively removed therefrom.

10. Process as in claim 9 including step of (a) continuously maintaining the elastic mass of such plant initially within the outline of such plant under a steady range of pressure while and by sideways bending and shaking successively elevated portions of the plant and (b) smoothly applying upward and lateral forces on the body of each of the fruits relative to the stems therefor and thereby breaking only the more brittle stems of the more mature fruit and so selectively removing the more mature fruits from the plant.

11. Process as in claim 10 including the step of pushing the lower parts of the plant from left to right and back again to provide a shaking action while also alternately elastically compressing and releasing the plant, and the amplitude of such shaking and compressing action decreases as the height of the zone of contact of plant and said spirally wound rods increases.

12. Process as in claim 11 including the steps of releasing the plant after completion of said process and, after a period of time during which said plant grows and its fruit mature, repeating said process on said same plant.

* * * * *